Feb. 6, 1940.  F. L. MAIN  2,189,014
BRAKE MECHANISM
Filed March 11, 1936  5 Sheets-Sheet 1

INVENTOR
FRANK L. MAIN
BY
ATTORNEYS

Feb. 6, 1940.                F. L. MAIN                2,189,014
                          BRAKE MECHANISM
                    Filed March 11, 1936           5 Sheets-Sheet 2

INVENTOR
FRANK L. MAIN
BY
ATTORNEYS

Feb. 6, 1940. F. L. MAIN 2,189,014
BRAKE MECHANISM
Filed March 11, 1936 5 Sheets-Sheet 3

INVENTOR
FRANK L. MAIN
ATTORNEYS

Feb. 6, 1940. F. L. MAIN 2,189,014
BRAKE MECHANISM
Filed March 11, 1936  5 Sheets-Sheet 4
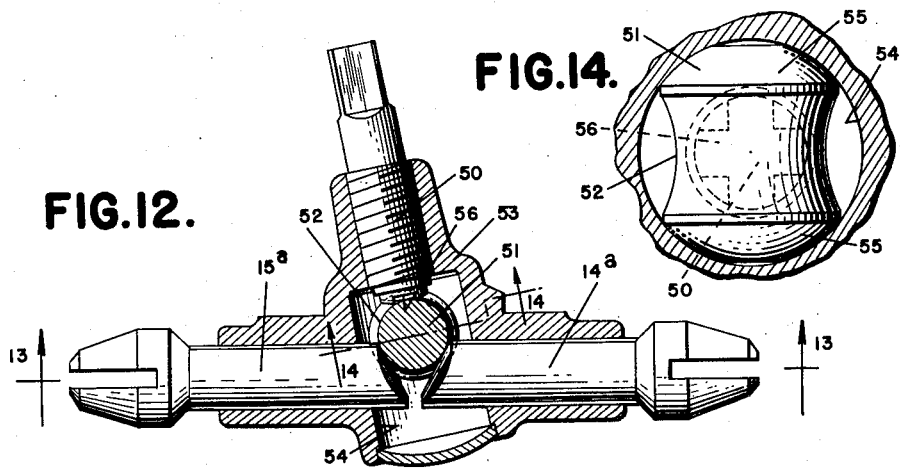
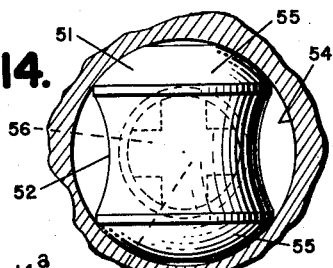
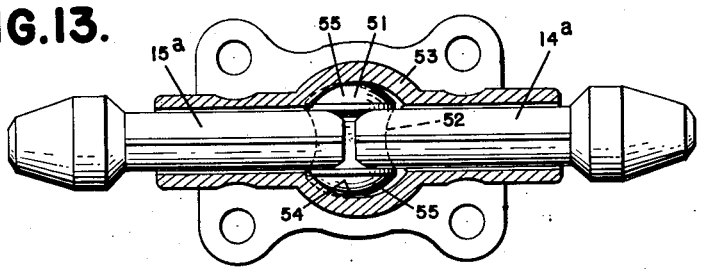
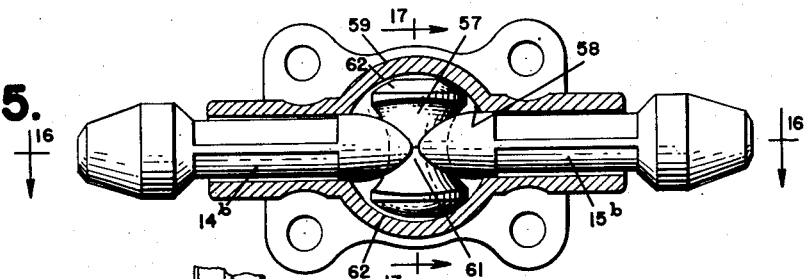
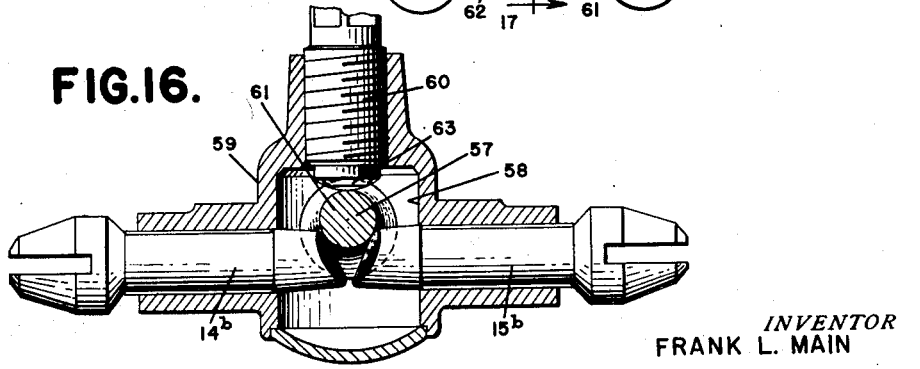
INVENTOR
FRANK L. MAIN
ATTORNEYS Feb. 6, 1940.  F. L. MAIN  2,189,014
BRAKE MECHANISM
Filed March 11, 1936   5 Sheets-Sheet 5

INVENTOR
FRANK L. MAIN
BY
ATTORNEYS

Patented Feb. 6, 1940

2,189,014

UNITED STATES PATENT OFFICE 2,189,014

BRAKE MECHANISM

Frank L. Main, Birmingham, Mich., assignor to Kelsey-Hayes Wheel Company, Detroit, Mich., a corporation of Delaware Application March 11, 1936, Serial No. 68,332

25 Claims. (Cl. 188—79.5)

The invention relates to brake mechanisms and refers more particularly to adjustment anchor devices for brake shoes.

In brakes having their friction linings formed of the same material, the friction linings of the primary shoes usually wear at a greater rate than the friction linings of the secondary shoes. It is an object of the present invention to provide an adjustment anchor device for both the primary and secondary shoes which will compensate for the differential wear.

Another object is to provide an improved adjustment anchor device which will reduce the friction and wear between its parts and improve the braking action. Further objects are to provide an adjustment anchor device having provision for transferring a predetermined amount of torque from one shoe to the other, and to provide an adjustment anchor device having provision for both radial and circumferential movement of the shoes.

These and other objects of the invention will become apparent from the following description, taken in connection with the accompanying drawings, in which Figure 1 is an elevation, partly in section, of a brake mechanism showing an embodiment of my invention;

Figures 2 and 3 are cross sections on the lines 2—2 and 3—3 respectively of Figure 1;

Figure 12 is a longitudinal sectional view through another modified form of adjusting device;

Figure 13 is a sectional view taken substantially on the line 13—13 of Figure 12;

Figure 14 is a sectional view taken substantially on the line 14—14 of Figure 12;

Figure 15 is a sectional view of a further modified form of adjusting device;

Figure 16 is a sectional view taken on the plane indicated by the line 16—16 of Figure 15;

Figure 1:
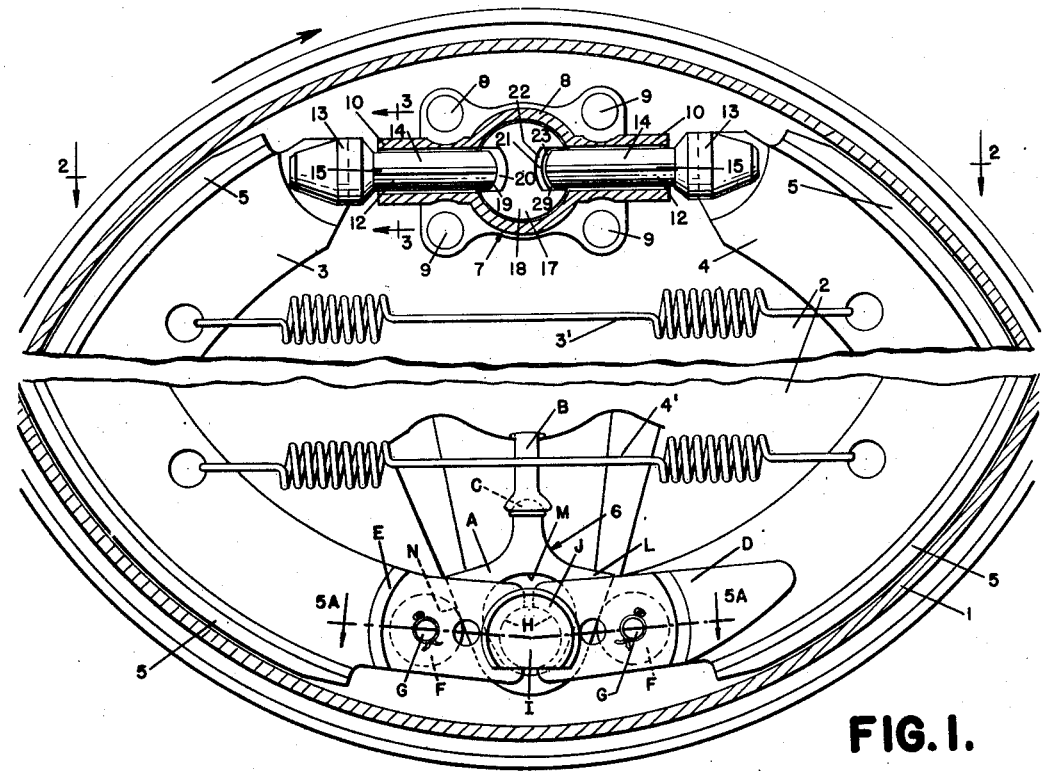
Figure 2:
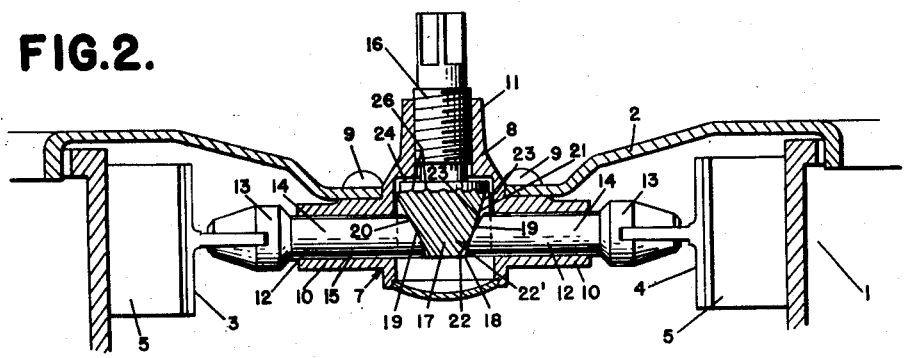

The brake mechanism illustrated in Figures 1, 2, 3, 4, 5 and 5A comprises the brake drum 1, the backing plate 2 and the pair of brake shoes 3 and 4 within the brake drum and having the friction linings 5 formed of the same material and engageable with the brake flange. The brake shoes have spaced ends anchored upon the backing plate 2 and also have spaced ends for engagement by a suitable actuator 6 which is adapted to force the shoes into frictional contact with the brake flange. In the present instance, the upper ends of the shoes are adapted to be anchored upon the backing plate and their lower ends are engageable with the actuator. Suitable upper and lower springs 3' and 4' respectively are connected to the upper ends and the lower ends of the brake shoes to retract and hold the brake shoes in their normal or inoperative positions.

Assuming the brake drum to be rotating in the direction indicated by the arrow in Figure 1, the brake shoe 3 is the primary or leading shoe and the brake shoe 4 is the secondary or trailing shoe. The friction lining 5 of the primary shoe 3 usually wears at a faster rate than the friction lining of the secondary shoe. In many brake constructions, the wear of the lining of the primary shoe varies from slightly greater than one to five times the wear of the lining of the secondary shoe.

For anchoring the shoes 3 and 4 upon the backing plate, I have provided the adjustment anchor device 7 which is located between the spaced shoe ends. This device has the bracket 8 which is fixedly secured to the backing plate 2 by suitable means, such as the rivets 9. This bracket has the spaced tubular portions 10 located within the brake drum and the transverse internally threaded portion 11 extending through the backing plate. The tubular portions 10 have cylindrical bores which are axially aligned and through which extend the adjustment links 12. These adjustment links have at their outer ends the heads 13 which are slotted to receive the ends of the brake shoes. In the present instance, these brake shoes are of T-section and the ends of their stems or webs engage the slots in the heads and are adapted to abut the bottoms of the slots.

To provide for movement of the anchored ends of the brake shoes radially outwardly upon outward swinging of these shoes and to thereby permit more complete frictional engagement of the linings of the shoes with the brake flange, the stems 14 of the adjustment links have an outer diameter slightly smaller than the internal diameter of the cylindrical bore of the tubular portions 10 so that the adjustment links may move angularly in the tubular portions through paths parallel to the brake shoes. To prevent transverse movement of the adjustment links in the tubular portions, the stems 14 are provided with the diametrically opposite projections 15 in the nature of longitudinally extending ribs for engaging the inner and outer side walls of the tubular portions. There is preferably a slight clearance between these ribs and the side walls sufficient to permit the required limited angular movement of the adjustment links.

For adjusting the adjustment links, I have provided the screw 16 threadedly engaging the portion 11 of the bracket and having an exposed polygonally shaped end for engagement by a suitable tool, such as a wrench. I have also provided the wedge 17 located between the tubular portions 10 and engageable with the adjustment links and adapted to be axially or longitudinally adjusted by means of the screw 16. This wedge has the cylindrical body 18 and the diametrically opposite grooves 19 for loosely receiving the inner flattened end portions of the adjustment links 14. These grooves have the bottoms 20 and 21 which are inclined relative to the axis of the wedge and which are engageable with the inner ends of the adjustment links. The bottom 21 has the lower end portion 22 inclined at the same angle as the bottom 20 and the upper end portion 23 inclined at a smaller angle.

The arrangement is such that when the ends of the adjustment links engage the lower end portion of the wedge both brake shoes are correspondingly positioned relative to the adjustment anchor device and their friction linings may be properly ground. This grinding operation is performed during the manufacture and prior to the assembly with the brake drum and backing plate. However, after assembly axially inward adjustment of the wedge positions the wedge so that the adjustment links engage the outer portions of the bottoms of the grooves and the adjustment link for the secondary shoe 4 engages the portion 23 of the bottom 21. It will be seen that at this time axial adjustment of the wedge advances the adjustment link for the primary shoe at a greater rate than the adjustment link for the secondary shoe. The angles of the bottom 20 and the portion 23 of the bottom 21 are predetermined in accordance with the approximate rate of wear of the friction linings of the primary and secondary shoes so that adjustment of the anchor device compensates for the wear to provide equal clearance between the shoes and the drum.

Attention is called to the fact at this time that the flattened end portion of the link associated with the secondary shoe is fashioned to provide angularly arranged lower and upper surfaces 22' and 23' complementary to the angularly disposed surfaces 22 and 23 respectively on the bottom 21 of the adjacent groove 19 in the wedge. With this arrangement a gradual change of rate of adjustment of the secondary shoe is effected at the zone of the junction of the complementary angularly disposed surfaces aforesaid and this is desirable in that it prevents abrupt change in rate of adjustment in the movement of the secondary shoe. It will be noted from Figure 1 that the adjustment link 14 for the primary shoe is provided with a similar flattened end portion so that these links may be interchangeable.

Figure 5A:
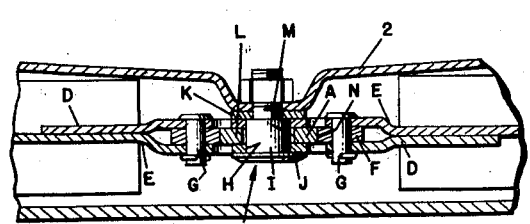
Figure 5A is a sectional view taken on the line 5A—5A of Figure 1.
Figure 3:
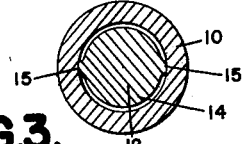
Figure 5:
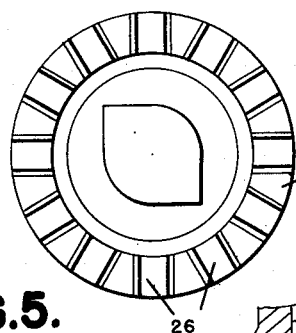
Figures 4 and 5 are plan views of cooperating parts of the mechanism.
Figure 4:
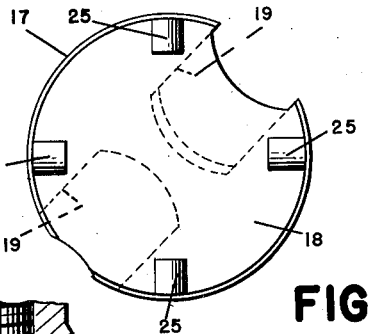

The screw 16 has at its inner end the flat head 24 which is of approximately the same diameter as the wedge 17 and which is engageable with this wedge to lock the screw from accidental turning and also to indicate predetermined increments of adjustment. The outer surface of the wedge and the inner surface of the flat head are formed with cooperating projections and recesses which are adapted to cam over each other upon rotation of the screw 16 and which are adapted to effect the locking and to indicate predetermined increments of adjustment. As shown particularly in Figure 4, the wedge is provided with the angularly spaced rounded radially extending projections 25 and, as shown in Figure 5, the flat head 24 is provided with the radially extending recesses 26 having inclined sides. The relative sizes of the projections and recesses are such that the wedge may have a limited movement transversely of the head.

The projections 25 and cooperating recesses 26, previously described, render it possible to maintain the desired minimum clearance between the shoes and the drum. In this connection, it is to be noted that the recesses 26 on the wedge 17 loosely fit (to a predetermined tolerance) the complementary projections 25 on the head of the adjusting screw. It necessarily follows, therefore, that as the wedge is advanced, the projections 25 climb upwardly and downwardly on the side walls of the recesses 26. The heighth of the climb is predetermined to insure a minimum net clearance, between the shoes and the drum, which is preferably in excess, by a known amount, of the advance per increment of adjustment provided by the lead of the adjusting screw 16.

The wedge 17 is located within a cylindrical bore of the bracket 8 and the diameter of this bore is slightly greater than the diameter of the cylindrical body 18 of the wedge, thereby providing clearance between the bracket and the wedge so that the latter may move in a generally circumferential direction. This construction, with that of the projections and recesses above described, allows for variations in locating or centering the wedge during adjustment to compensate for deviations in wear of the linings of the brake shoes. These constructions also provide for transmission of some torque from one brake shoe to the other by the wedge, thereby providing servo action. The greater the clearance, the greater the amount of torque which can be transmitted. It has been found from actual tests that by varying the clearances from .005 to .010 inch the brake effectiveness has been increased up to approximately 15% and at the same time the wedge will center itself automatically when the brake is released. Further increase in clearance within limits results in increased effectiveness of the brake. By varying the clearance, the amount of torque which can be transmitted from one shoe to the other by the wedge can be limited or predetermined and no additional torque can be transmitted. In other words, a predetermined amount of torque can be measured off regardless of how hard the brake is applied. As a result, a certain clearance can be designedly provided to secure a predetermined transmission of torque for a particular size brake and weight of car, as well as various combinations of linings on the primary and secondary brake shoes. The advantage of this type of construction is that the performance of the brake will not vary with different types of road conditions, changes in weather and changes in load. As soon as the torque has been measured off and the angle of the deceleration curve has been determined, there is no further increase in angle of the curve and the effectiveness of the brake tapers off at the peak of the curve without grabbing.

From the foregoing, it will be understood that the construction provides for transferring limited torque through lateral movement of the wedge in the anchor bracket 8 in the direction of rotation of the brake, whether backing up or going forward. The difference between the diameter of the wedge 17 and the bore of the bracket 8, previously referred to, permits circumferential movement of both shoes and thus develops energization in both shoes. It may be pointed out in this connection that the lead of the recesses 26 and their spacing are so arranged that as torque is transferred through the adjustment anchor, the projections 25 on the wedge climb up the sides of the recesses but cannot pass over. Therefore, when the brake is released, the projections 25 on the wedge slide back into the recesses and this renders it possible to eliminate supplementary retraction springs. It is also to be noted that the climbing of the projections 25 effects a slight expansion of the shoes and this is desirable since it tends to moderate the wrap or, in other words, eliminates the grab usually present in servo brakes. In fact, a brake constructed in accordance with this invention will not lock-up at any pressure below the skid point of the tires, since the amount of servo is always limited to the difference in diameter between the bore of the anchor bracket and the outside diameter of the wedge, which difference is predetermined and calibrated for each application.

It will also be noted that by reason of the wedge being movable to some extent in a generally circumferential direction and the adjustment links being movable angularly to some extent through paths parallel to the brake shoes, the construction provides for radial and circumferential floating movements of the shoes during brake application. This operation is essential to reduce the pumping or galloping effect produced by the distortion of the brake drum or by eccentricity or run-out of the brake drum.

It will, of course, be understood that the construction of the actuator 6 must be such as to permit the shoes to move circumferentially and radially. One type of actuator that may be employed for accomplishing this result is shown in the drawings and the following is a brief description thereof.

The brake shoes are adapted to be forced into frictional contact with the brake flange of the drum by means of a wedge A engageable with the lower ends of the shoes and adapted to be longitudinally moved in a radially outward direction by means of the longitudinally movable push rod B having the lower end engageable with a head C on the upper end of the wedge A. In detail, it will be noted that each of the brake shoes is preferably of T-shaped cross section and has at its lower ends, a pair of laterally spaced extensions or extension plates D. As shown in Figure 5A, one of the plates is formed by laterally offsetting the lower end of the web or stem of each brake shoe in the manner designated by the reference character E and the other plate is formed by a member welded or otherwise suitably secured to the stem. Located between the extensions at the lower end of each brake shoe is a roller F positioned beyond the stem or web of the brake shoe and journalled upon a pin G extending through the extensions. The free ends of the extensions are formed with concave seats H for engaging a shouldered pin I which is fixedly secured to the backing plate of the drum. The shouldered pin I forms an abutment for the lower ends of the brake shoes and predetermines their normal or inoperative positions. In this connection, attention is called to the fact that the head J of the pin and the washer K engaging the shoulder of the pin serve to guide the lower ends of the shoes in their movements toward and away from the brake flange.

The wedge A has a flat sheet metal body portion L apertured as at M for receiving the shouldered pin I. It will be noted from Figure 5A that the flat body portion of the wedge is adapted to extend between the pairs of extensions at the lower ends of the shoes and is provided with upwardly diverging edges N engageable with the rollers F. The central opening M through the body portion has a peripheral dimension greater than the diameter of the portion of the shouldered pin I extending therethrough, so as to provide sufficient clearance to enable the wedge A to adjust itself to the shoes in the event they move unequal extents when being forced into frictional engagement with the brake flange. In other words, the wedge A is permitted to float relative to the pin I and this is desirable in that it permits the circumferential shifting movement of the shoes previously referred to. In addition, it will be noted that the extremities of the two pairs of extensions engage the pin I in such a manner as to permit the radial shifting movement of the shoes heretofore mentioned.

From the foregoing, it will be apparent that either shoe may move radially independent of the other and also may move circumferentially relative to the drum within the limits of the servo controlled by the relative diameter of the bore and the cylindrical body portion 18 of the wedge 17. The operation then is as follows: When both shoes of the brake are expanded, the secondary shoe acts as a heel or a brace through its tendency to leave the drum because the direction of rotation counteracts movement of the same into engagement with the brake surface. As the secondary shoe tends to leave the drum, the floating link permits it to move in a generally radial and circumferential direction toward the actuator and thus apply the primary shoe. Through its floating link, the primary shoe also moves in a generally radial and circumferential direction into engagement with the brake surface and is assisted in this function by the direction of rotation of the drum. The primary shoe also transmits the torque generated to the wedge 17 and functions to move this wedge laterally in the direction of rotation. As the wedge 17 moves laterally, the same is also moved axially owing to the action of the projections 25 and the recesses 26, and this axial movement of the wedge serves to slightly decrease the clearance of the shoes until sufficient force has been applied to engage the wedge against one side of the bore in the anchor bracket. It will be understood that this movement applies the adjustment end of the secondary shoe to the drum in the direction of rotation of the latter with the result that the wrap assists in moving the secondary shoe around the drum and the torque thus accumulated is added to the primary shoe, which cannot move any farther circumferentially because of the engagement of the wedge with the side of the bore in the anchor bracket. The brake then operates in much the same manner as the conventional two shoe brake except that both shoes are permitted to move circumferentially and radially to adopt their circumference to the out of round conditions of both the drum and the lining. The ultimate result being a smooth controlled deceleration.

Figure 6:
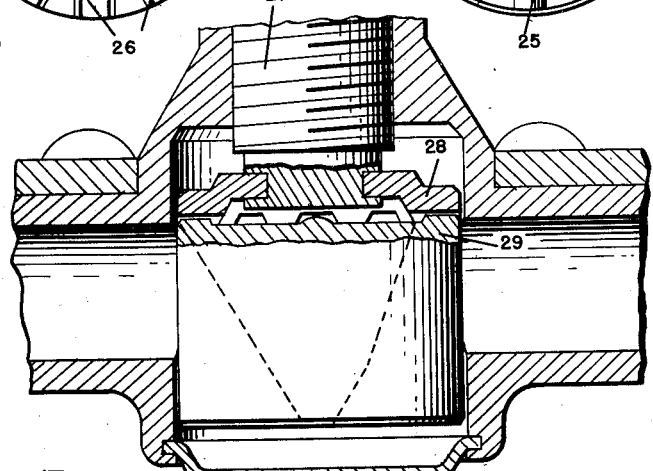
Figure 6 is a view similar to Figure 2 showing another embodiment of my invention.

The modification illustrated in Figure 6 is very similar to that illustrated in Figures 1 to 5A inclusive with the exception that the screw 27 has fixedly secured to its inner end the dished head 28, the inner peripheral portion of which is engageable with the wedge 29 to effect the axially inward adjustment of the latter.

Figure 7:
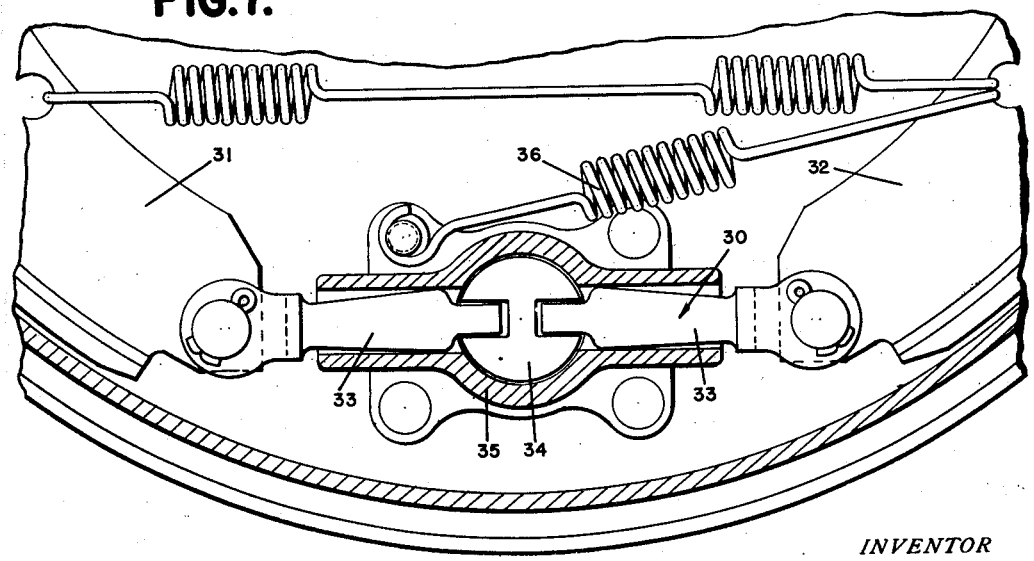
Figure 7 is a view similar to Figure 1 showing another embodiment of my invention.

Figure 7 illustrates another embodiment differing from that shown in Figures 1 to 5A inclusive in pivotally connecting the outer ends of the adjustment links 30 to the ends of the primary and secondary brake shoes 31 and 32 and in tapering the stems 33 of these adjustment links to have decreasing cross section outwardly from their inner ends to thereby provide for angular movement of the adjustment links relative to the adjustment bracket. The structure illustrated in this figure also differs in that there is greater clearance between the wedge 34 and the wall of the bore of the bracket 35 to thereby increase the brake effectiveness through transmission of increased torque from the primary shoe to the secondary shoe. To assist in returning the parts to their normal positions, including positioning or centering the wedge when the brake is released, I have provided the supplemental spring 36 which is connected to the secondary shoe and the bracket.

Figure 8:
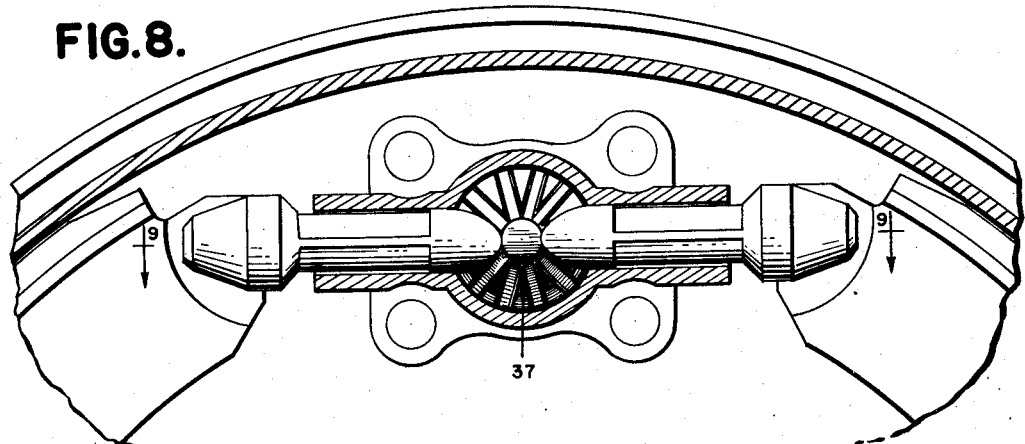
Figure 8 is a view similar to Figure 1 showing another embodiment of my invention.
Figure 9:
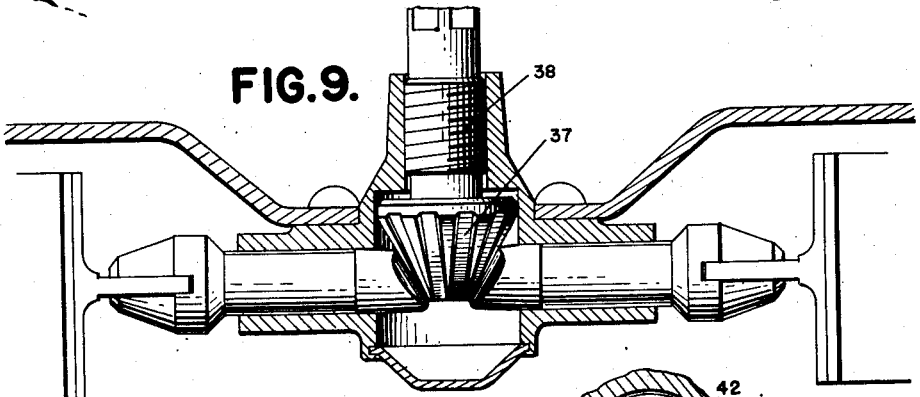
Figure 9 is a sectional view taken on the line 9—9 of Figure 8.

Figures 8 and 9 illustrate another embodiment in which the wedge 37 is rotatable with the screw 38. All portions of the wedge engageable with the adjustment links have the same angle to the axis of the wedge so that in this modification the adjustment anchor device does not differentially adjust the brake shoes.

Figure 11:
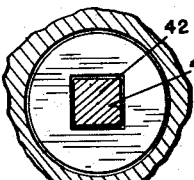
Figure 11 is a cross section on the line 11—11 of Figure 10.
Figure 10:
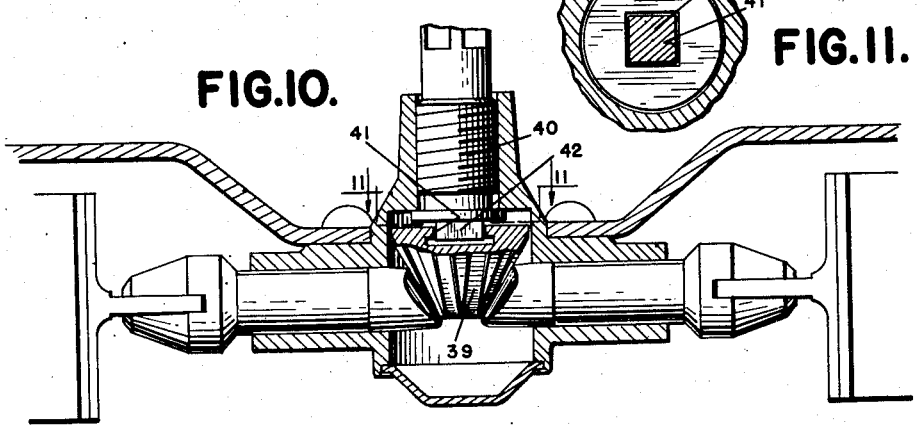
Figure 10 is a view similar to Figure 9 showing another embodiment of my invention.
Figure 17:
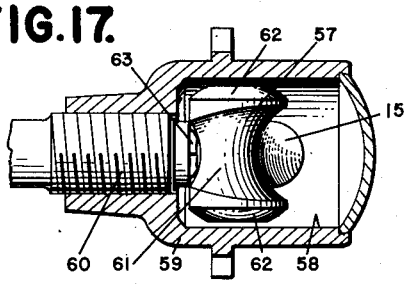
Figure 17 is a sectional view taken on the plane indicated by the line 17—17 of Figure 16.
Figure 18:
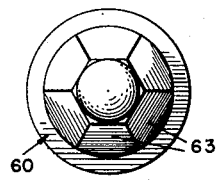
Figure 18 is an end elevational view of the adjusting screw shown in Figure 16.
Figure 19:
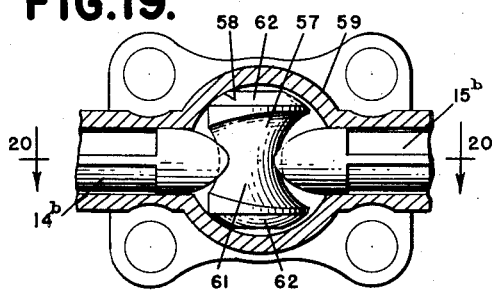
Figure 19 is a fragmentary view similar to Figure 15 showing the parts in another position of adjustment.
Figure 20:
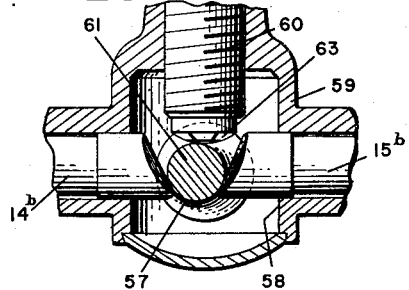
Figure 20 is a sectional view taken substantially on the plane indicated by the line 20—20 of Figure 19.
Figure 21:
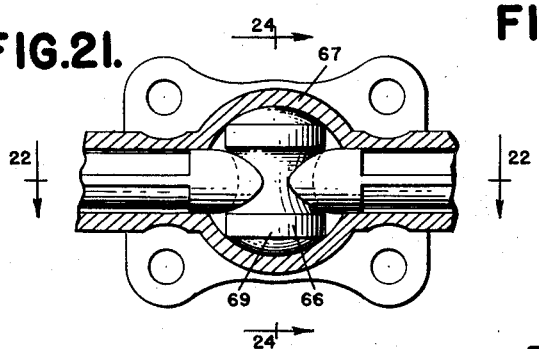
Figure 21 is a fragmentary sectional view illustrating a further modified form of adjusting device.
Figure 22:
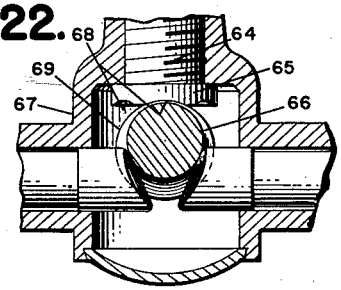
Figure 22 is a sectional view taken substantially on the plane indicated by the line 22—22 of Figure 21.
Figure 24:
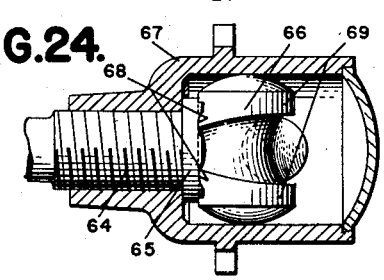
Figure 24 is a sectional view taken substantially on the plane indicated by the line 24—24 of Figure 21.
Figure 23:
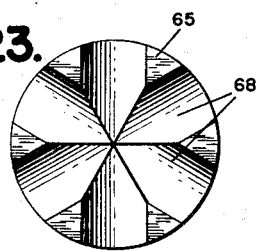
Figure 23 is an end elevational view of the adjusting screw shown in Figure 22.

Figures 10 and 11 illustrate a modification of the structure shown in Figures 8 and 9. In this modification the wedge 39 is formed separately from the screw 40. This wedge has the polygonal recess 41 in its outer end into which extends the polygonal projection 42 at the inner end of the screw. As shown, both the recess and projection are square. The dimensions of the recess are greater than the dimensions of the projection so that clearance is provided and as a result the wedge can move transversely of the screw and in a generally circumferential direction to transmit torque from one brake shoe to the other and to thereby increase the effectiveness of the brake. In this construction it will be noted that the screw directly abuts the wedge.

The embodiment of the invention illustrated in Figures 12 to 14 inclusive shows a construction wherein the results set forth in the first described form of the invention may be secured without the use of the especially designed wedge 17 and by merely inclining the adjusting screw 50. The angle of inclination of the adjusting screw 50 is shown in Figure 12 as so determined to impart an advance to the primary and secondary shoes proportionate to the wear of the friction surface on the latter shoes. In detail, movement is transferred from the screw 50 to the shoes through the medium of a roller 51 and the adjusting links 14ª and 15ª. These links are shown as identical in construction to the links 14 in the first described form of the invention, with the exception that the inner ends thereof the fashioned to engage the intermediate portion 52 of the roller and are not provided with complementary angular surfaces. In other words, the links 14ª and 15ª are slidably supported in an anchor bracket 53 and the roller 51 is housed in the bore 54 of the bracket for engagement with the inner ends of the adjustment links. Upon reference to Figure 14, it will be noted that the ends 55 of the roller 51 are spherical in shape and have a radius approximating the radius of the bore 54 for engagement therewith. In this connection, attention is called to the fact that the axis of the bore 54 is inclined to correspond with the inclination of the axis of the screw 50 and accordingly, axial adjustment of the roller 51 by the screw advances the link 14ª connected to the primary shoe at a greater rate than the link 15ª connected to the secondary shoe. It will also be observed from Figure 14 that the inner end of the adjusting screw 50 is notched as at 56 to provide increments of advance in adjustment of the roller 51 and to also center this roller when the brake is released. Owing to the mounting of the roller 51 in the bore, it necessarily follows that the roller is permitted to float, to a certain extent, circumferentially so as to provide for the transmission of torque from one shoe to the other, in the manner defined with some particularity in connection with the first described form of this invention.

Referring now to the modified form of the invention illustrated in Figures 15 to 20 inclusive, it will be noted that this construction provides for relatively advancing the primary and secondary shoes proportionate to the wear of the friction surfaces on the shoes. In general, this is accomplished by providing an eccentric roller 57 in the bore 58 of the anchor bracket 59. In this embodiment of the invention, the axis of the bore 58 is not inclined as in the preceding modification, nor is the adjusting screw 60 which is threaded in the anchor bracket to engage the eccentric intermediate portion 61 of the roller 57. In addition, the anchor brackets form a slidable support for the links 14ᵇ and 15ᵇ which are respectively connected to the primary and secondary shoes. These links are adjusted by the screw 60 through the roller and, due to the eccentricity of the latter shown in Figure 19, adjustment of the screw 60 moves the primary shoe adjusting link 14ᵇ at a greater rate than the secondary shoe adjusting link 15ᵇ.

It will be noted from Figure 15 that the opposite ends of the roller 57 are provided with enlarged spherical heads 62 having a radius slightly less than the radius of the bore 58 so as to permit circumferential shifting movement of the roller relative to the bore. The parts are shown in Figures 15 and 16 in their shifted position and this shifting movement renders it possible to transmit the brake torque from one shoe to the other, in the manner previously described, and the torque transferred is resisted by the friction set-up between the inner end of the adjusting screw 60 and the roller. In this connection, it will be noted that the inner end of the adjusting screw is provided with a plurality of flats 63 inclined inwardly toward the axis of the adjusting screw and operate not only to indicate predetermined increments of advance in adjustment of the roller, but also to center the roller in the bore 58 when the brake is released.

The embodiment of the invention featured in Figures 21 to 24 inclusive is similar to the modification illustrated in Figures 15 to 20 inclusive, but differs therefrom in that the inner end of the adjusting screw 64 is provided with a head 65 presenting a flat surface to the roller 66 in the anchor bracket 67. The flat surface is recessed to form a plurality of predeterminedly arranged notches 68 having a radius approximating the radius of the enlarged ends 69 of the roller for engagement therewith to not only center the roller in the anchor bracket, but to also provide the required increments of advance in the adjustment of the roller.

What I claim as my invention is:

1. In a brake mechanism, the combination with a brake drum and brake shoes engageable with said drum and having spaced ends, of an adjustment anchor device for said shoes located between said ends, said device comprising a bracket, links guided by said bracket and operatively connected to said ends, and a longitudinally adjustable wedge carried by said bracket and having differently inclined parts for adjusting said links.

2. In a brake mechanism, the combination with a brake drum and brake shoes engageable with said drum and having spaced ends, of an adjustment anchor device for said shoes located between said ends, said device comprising a bracket and a longitudinally adjustable wedge carried by said bracket and having differently inclined parts for adjusting said ends.

3. In a brake mechanism, the combination with a brake drum and brake shoes engageable with said drum and having spaced ends, of an adjustment anchor device for said shoes located between said ends, said device comprising a bracket and a wedge adjustably mounted upon said bracket having different contact parts for differentially adjusting said ends.

4. In a brake mechanism, the combination with a brake drum and brake shoes supported within the drum for shifting movement circumferentially of said drum and having spaced ends, of an adjustment anchor device for said shoes located between said ends, said device comprising a bracket, and means shiftable with the brake shoes and adjustably mounted on said bracket for differentially adjusting said ends.

5. In a brake mechanism, the combination with a brake drum and brake shoes engageable with said drum and having spaced ends, of an adjustment anchor device for said shoes located between said ends, said device comprising an adjustable member having separate portions for adjusting said shoes, said portions having corresponding parts for adjusting said shoes at the same rate and different parts for differentially adjusting said shoes.

6. In a brake mechanism, the combination with a brake drum and brake shoes engageable with said drum and having spaced ends, of an adjustment anchor device for said shoes extending between said ends, said device comprising a bracket having substantially aligned tubular portions, links operatively connected to said ends and extending through said tubular portions, and means carried by said bracket and located between said links for adjusting the latter, said links being angularly movable through a path substantially parallel to said shoes and being provided with diametrically opposite projections extending transversely of said path and having limited contact with the opposite sides of said tubular portions to limit angular movement of said links in a transverse direction.

7. In a brake mechanism, the combination with a brake drum and brake shoes engageable with said drum and having spaced ends, of an adjustment anchor device for said shoes extending between said ends, said device comprising a bracket having substantially aligned cylindrical portions, links operatively connected to said ends and extending through said substantially cylindrical portions, and means carried by said bracket and located between said links for adjusting the latter, said links being angularly movable through a path substantially parallel to said shoes and being provided with diametrically opposite longitudinally extending narrow ribs transversely of said path for contact with the opposite sides of said tubular portions to limit angular movement of said links in a transverse direction.

8. In a brake mechanism, the combination with a brake drum and brake shoes engageable with said drum and having spaced ends, of an adjustment anchor device for said shoes located between said ends, said device comprising a bracket, links guided by said bracket and operatively connected to said ends, an axially adjustable wedge for adjusting said links, a rotatable member for adjusting said wedge axially, and cooperating means upon said wedge and member for indicating predetermined increments of adjustment.

9. In a brake mechanism, the combination with a brake drum and brake shoes engageable with said drum and having spaced ends, of an adjustment anchor device for said shoes located between said ends, said device comprising a bracket, an axially adjustable wedge having different parts for differentially adjusting said ends, a rotatable member for adjusting said wedge axially, and cooperating means upon said wedge and member for indicating predetermined increments of adjustment.

10. In a brake mechanism, the combination with a brake drum and brake shoes engageable with said drum and having spaced ends, of an adjustment anchor device for said shoes located between said ends, said device comprising a bracket, an axially adjustable wedge for adjusting said ends, means for holding said wedge from rotation, a rotatable member carried by said bracket for adjusting said wedge axially, and cooperating means upon said wedge and member for indicating predetermined increments of adjustment.

11. In a brake mechanism, the combination with a brake drum and brake shoes engageable with said drum and having different rates of wear, of an adjustment device for said shoes providing different rates of adjustment substantially in accordance with the rates of wear including a member supported between the ends of the shoes for movement along a path substantially parallel to the axis of rotation of the brake drum, and means for guiding said member.

12. In a brake mechanism, the combination with a brake drum and brake shoes engageable with said drum, one of said shoes wearing at a greater rate than the other, of an adjustment device for said shoes providing a greater rate of adjustment for said first mentioned shoe than that for said mentioned shoes, said device including a member supported between adjacent ends of the shoes for movement in a direction substantially parallel to the axis of rotation of the brake drum.

13. In a brake mechanism, the combination with a brake drum and brake friction means engageable with said drum and having ends, of an adjustable member for adjusting said ends, a second adjustable member for adjusting said first mentioned member, and cooperating means upon said members for locking one of said members in adjusted position.

14. In a brake mechanism, the combination with a brake drum and brake shoes engageable with said drum, of an adjustment anchor device for said shoes, said device providing for radial shifting movement of the shoes relative to the drum and also providing for circumferential movement of said shoes.

15. In a brake mechanism, the combination with a brake drum and brake shoes engageable with said drum, of an adjustment anchor device for said shoes, said device comprising a member for adjusting said shoes, said member being movable with said shoes upon circumferential movement thereof, and means between said member and shoes and movable to provide for radial movement of said shoes.

16. In a brake mechanism, the combination with a brake drum and brake shoes engageable with said drum, of an adjustment anchor device for said shoes, said device providing for radial shifting movement of the shoes relative to the drum and also providing for circumferential movement of said shoes and being provided with means for limiting the circumferential movement.

17. In a brake mechanism, the combination with a brake drum and brake shoes engageable with said drum, of an adjustment anchor device for the shoes, an actuating device for the shoes, both of said devices providing for radial shifting movement of the shoes relative to the drum and also providing for circumferential movement of the shoes.

18. In a brake mechanism, the combination with a brake drum and brake shoes engageable with said drum and having spaced ends, of an adjustment anchor device for the shoes located between the ends, said device comprising a bracket, a member supported by the bracket for movement at an angle to a line parallel to the axis of the drum and engageable with the extremities of the shoes to advance one shoe at a greater rate than the other, and rotatable means for advancing the member along the path of travel aforesaid.

19. In a brake mechanism, the combination with a brake drum and brake shoes engageable with said drum and having spaced ends, of an adjustment anchor device for the shoes located between the ends, said device comprising a bracket having a bore inclined at an angle to a line parallel to the axis of the drum, a roller housed in the bore for movement axially of the latter and capable of limited circumferential displacement relative to the bracket, and an adjusting screw mounted for advancement along the axis of the bore and engageable with the roller.

20. A connection for brake shoes comprising a bracket formed with passages containing shoe-engaging plungers arranged end to end, a shiftable block formed with means acting wedgingly on the ends of said plungers, a member in the bracket keyed to said block to permit it to shift in a direction paralleling said plungers, and means for applying force through said member to said block.

21. A connection for brake shoes comprising shoe-engaging plungers arranged end to end, a shiftable block formed with means acting wedgingly on the ends of said plungers, a member keyed to said block to permit it to shift in a direction paralleling said plungers, and means for applying force through said member to said block.

22. A connection for brake shoes comprising a bracket formed with passages containing shoe-engaging plungers arranged end to end, a shiftable block formed with means acting wedgingly on the ends of said plungers, a member in the bracket keyed to said block to permit it to shift in a direction paralleling said plungers, and means for applying force through said member to said block, said bracket having means limiting movement of said block in one direction in such a manner that in one direction of braking said bracket serves as the brake anchor.

23. A connection for brake shoes comprising shoe-engaging plungers arranged end to end, a shiftable block formed with means acting wedgingly on the ends of said plungers, a member keyed to said block to permit it to shift in a direction paralleling said plungers, and means for applying force through said member to said block, and means limiting movement of said block in one direction and serving as a brake anchor in said one direction of braking.

24. A connection for brake shoes comprising a bracket formed with passages containing shoe-engaging plungers arranged end to end, a shiftable block formed with means acting wedgingly on the ends of said plungers, a member in the bracket keyed to said block to permit it to shift in a direction paralleling said plungers, and means for applying force through said member to said block, said bracket having means limiting movement of said block in one direction in such a manner that in one direction of braking said bracket serves as the brake anchor, together with a spring yieldingly holding the block at the end of its movement as determined by said limiting means.

25. A connection for brake shoes comprising shoe-engaging plungers arranged end to end, a shiftable block formed with means acting wedgingly on the ends of said plungers, a member keyed to aid block to permit it to shift in a direction paralleling said plungers, and means for applying force through said member to said block, and means limiting movement of said block in one direction and serving as a brake anchor in said one direction of braking, together with a spring yieldingly holding the block at the end of its movement as determined by said limiting means.

FRANK L. MAIN.